United States Patent [19]
Kanada et al.

[11] Patent Number: 5,563,627
[45] Date of Patent: Oct. 8, 1996

[54] HIGH-QUALITY CHARACTER GENERATOR

[75] Inventors: Kazumi Kanada, Takasaki; Yasushi Mashiko, Tokyo, both of Japan

[73] Assignees: Oki Electric Industry Co. Ltd.; Oki Firmware Systems Co. Ltd., both of Japan

[21] Appl. No.: 283,797

[22] Filed: Aug. 1, 1994

Related U.S. Application Data

[63] Continuation-in-part of Ser. No. 67,339, May 26, 1993, abandoned, which is a continuation of Ser. No. 622,551, Dec. 5, 1990, abandoned.

[30] Foreign Application Priority Data

Dec. 5, 1989 [JP] Japan ........................................ 314330

[51] Int. Cl.$^6$ ...................................................... G09G 5/22
[52] U.S. Cl. .................................................. 345/141; 345/142
[58] Field of Search ........................... 345/26, 141, 143, 345/124, 127, 194, 142; 395/110, 150; 382/300, 302

[56] References Cited

U.S. PATENT DOCUMENTS

| | | | |
|---|---|---|---|
| 4,561,017 | 12/1985 | Greene | 348/707 |
| 4,748,443 | 5/1988 | Uehara et al. | 345/142 |
| 4,831,568 | 5/1989 | Ito | 340/173 |
| 4,907,282 | 3/1990 | Daly et al. | 382/47 |
| 4,931,953 | 6/1990 | Uehara et al. | 345/144 |
| 4,990,903 | 2/1991 | Cheng et al. | 345/143 |

FOREIGN PATENT DOCUMENTS

| | | |
|---|---|---|
| 595523 | 3/1986 | Japan . |
| 63-163891 | 7/1988 | Japan . |
| 63-296122 | 12/1988 | Japan . |

*Primary Examiner*—Richard Hjerpe
*Assistant Examiner*—Amare Mengistu
*Attorney, Agent, or Firm*—Edward D. Manzo; Mark J. Murphy; Ted K. Ringsred

[57] ABSTRACT

In order to generate a character, the sampling point data of a character are read out of the sampling point file, and are multiplied by an integer to facilitate following processes for forming a high quality character. After that, X and Y coordinates and pressure values are subjected to the interpolation processing by interpolators and are further enlarged therein. The interpolated data are outputted to a circle generator unit of a pattern generator. The circle generator unit calculates parallel horizontal line data and generates independent circles composed of parallel horizontal lines on the basis of interpolated pressure values. The pattern shift unit of the pattern generator shift the independent circles into a pattern composed of parallel horizontal lines on the basis of the interpolated coordinate positions as a pattern. The pattern is reduced by a reduction unit as a pixel data to be stored in an image memory.

8 Claims, 14 Drawing Sheets

HIGH-QUALITY CHARACTER GENERATOR

This is a continuation-in-part of application Ser. No. 08/067,339 filed May 26, 1993 (now abandoned), which is a continuation of application Ser. No. 07/622,551, filed Dec. 5, 1990, now abandoned.

BACKGROUND OF THE INVENTION

1. Field of the Invention

The present invention relates to a high-quality character generator which generates character fonts and establishes the developed forms thereof.

2. Description of the Related Art

In conventional dot-matrix type character font generators which are used in information processing apparatuses, various types of data reduction methods have been used for generating large-scale font characters consisting of a great number of dots.

A conventional character font generator is disclosed in Japanese patent laid-open publication No. 163891/1988. This prior art font character generator retrieves several sampling points configuring a character from a sampling point file, and produces lines called skeleton lines that constitute the character by a skeleton line calculator using an approximation method. After that, the character generator determines, by means of a modifying information calculator, patterns associated with modifying information which are specified in advance with regard to respective points constituting the skeleton lines, and supplies and stores data representative of the patterns to an image memory.

This conventional high-quality character generator, however, has a disadvantage in that it requires an increasing number of sampling points to achieve more natural and beautiful characters, thus increasing the amount of information per one character. This makes it difficult to store data representing a great number of characters into a limited number of ROMs so as to incorporate them into output devices such as a printer or a CRT.

Furthermore, it requires additional sampling points to modify the printing type of characters or to join characters as cursive letters.

SUMMARY OF THE INVENTION

It is therefore an object of the present invention to provide a high-quality character generator in which the amount of information per a character is reduced, as well as the printing types or joining of characters can be modified without changing the sampling points or modifying information.

To accomplish this object, the character generator in accordance with the present invention forms font data on the basis of coordinates and a pressure value of each of the sampling points included in a character to be generated, and interpolating between the data so as to generate font data consisting of parallel horizontal line information representing pixel information of the character.

According to the present invention, there is provided a character generator comprising: sampling point file means for storing therein sampling point data representative of sampling points of a character, each of the sampling point data including an X abscissa, a Y ordinate and a pressure value of different one of the sampling points, said pressure values representing values at which character is written; sampling point read out means for reading out the sampling point data stored in said sampling point file means; first interpolating means for interpolating and enlarging the X and Y coordinate of the sampling point data read out from said sampling point file means to produce a resultant X and Y coordinate; second interpolating means for interpolating and enlarging the pressure values of the sampling point data read out from the sampling point file means to produce resultant pressure values; pattern generating means for generating circles consisting of parallel horizontal lines representing the interpolated pressure values of the sampling point data, and shifting the circles to a pattern representing a stroke of the character on the basis of the interpolated coordinate positions thereof fed from said first interpolating means; reduction means for reducing the pattern thus shifted by the pattern shift unit as pixel data of the character; and image memory means for storing therein output of the reduced pixel data from said reduction means.

In accordance with the present invention, data representative of the X and Y coordinate and a pressure value of each sampling point are stored in the sampling point file means in the form of sampling point data beforehand. To generate font data for a character, the sampling point data of the character are read out of the sampling point file means, and are multiplied by an integer to obtain a desired size of the character. Thereafter, the data are subjected to the interpolation processing by the interpolator means, and are further enlarged in the interpolator means. The interpolated data are outputted to pattern generator means. Then the pattern generator means generates enlarged font data represented by the horizontal line information for the character. The enlarged font data is fed to the reduction means so that the enlarged font data is reduced to a pixel data of suitable size. The pixel data as font data are stored to the image memory means to be displayed or printed.

BRIEF DESCRIPTION OF THE DRAWINGS

The objects and features of the present invention will become more apparent from the consideration of the following detailed description taken in conjunction with the accompanying drawings in which:

FIG. 4 is a view illustrating an example of sampling point data of the embodiment;

FIGS. 14A–14F are views illustrating output examples when the character is generated in cursive types, FIGS. 14A and 14B being examples in which each stroke is independently produced, FIGS. 14C and 14D being examples in which the terminal point of each stroke is once interrupted and then skipped to the next stroke, and FIGS. 14E and 14F being examples in which each stroke is joined to the next stroke;

Figure 15:
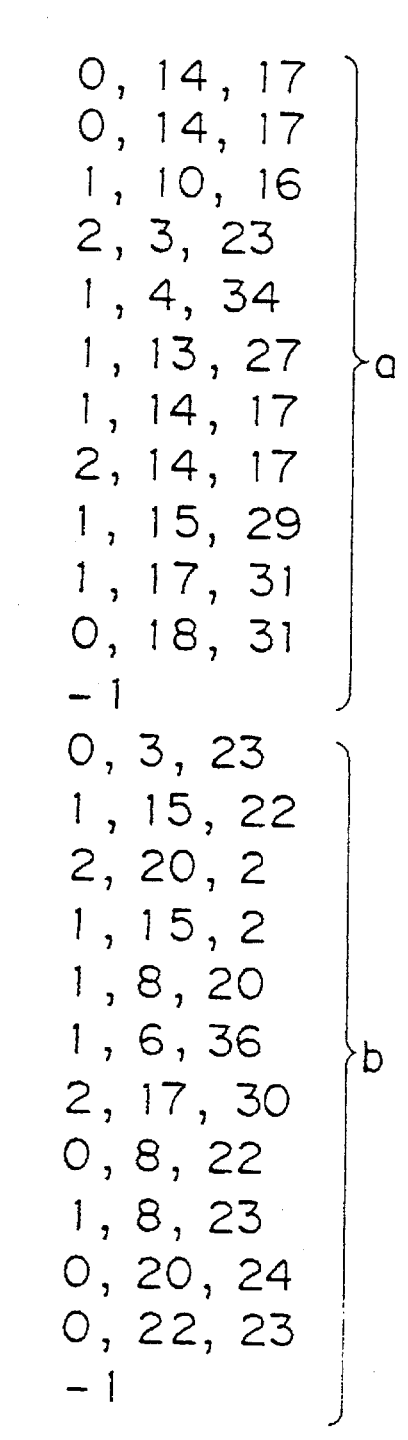

FIG. 15 is a view illustrating another example of sampling point data of the embodiment;

Figures 16, 17A, 17B, 17C, 18:
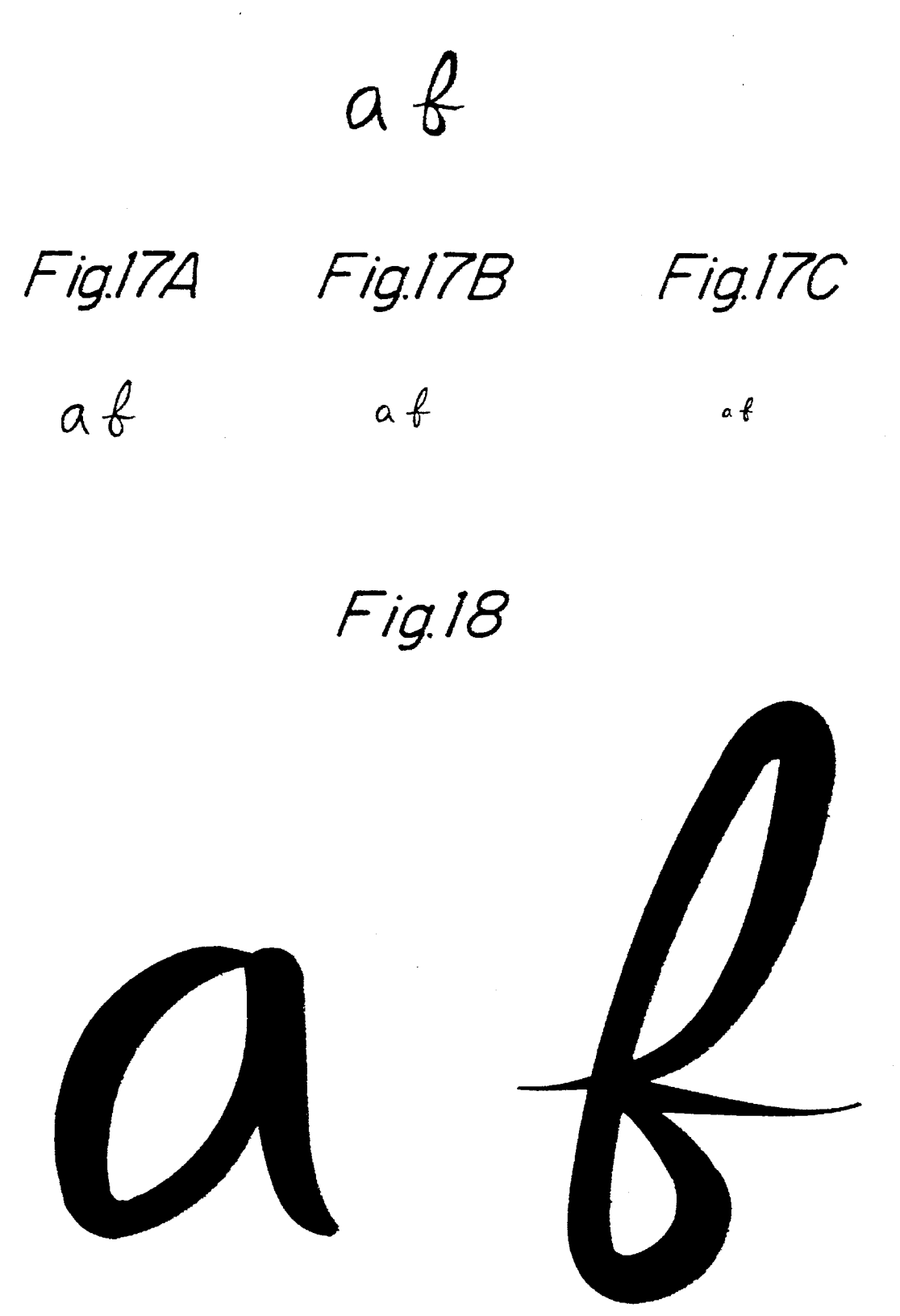

FIG. 16 is a view illustrating a pair of letters "ab" generated on the basis of the horizontal line information data representing the sampling points shown in FIG. 15;

FIGS. 17A, 17B and 17C are views illustrating reduced output of the horizontal line information data, FIG. 17A being an example reduced to 0.7, FIG. 17B being an example reduced to 0.5, and FIG. 17C being an example reduced to 0.3 of the letters shown in FIG. 16;

FIG. 18 is a view illustrating an enlarged example of the letters shown in FIG. 16;

DESCRIPTION OF THE PREFERRED EMBODIMENT

Figure 1:
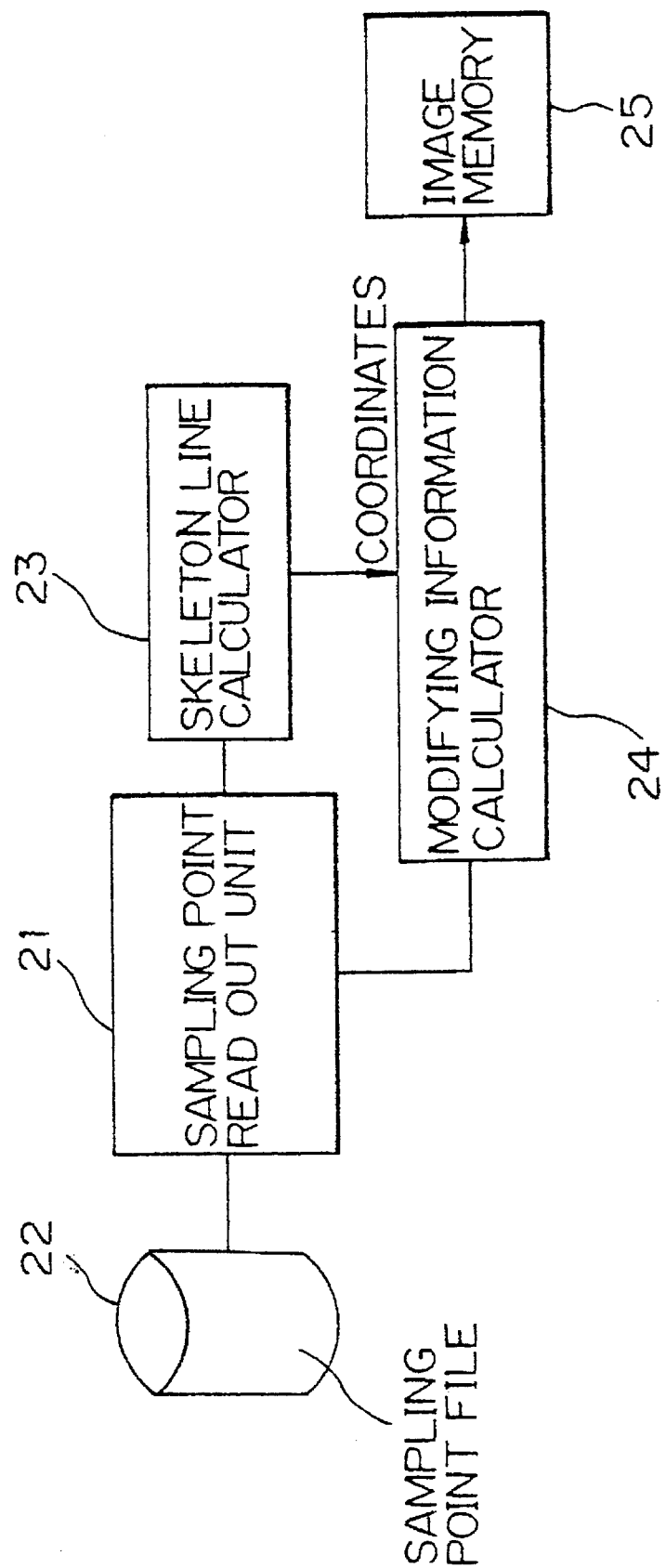
FIG. 1 is a block diagram showing the arrangement of a conventional character font generator.

Prior to describing the present invention, FIG. 1 is referenced in order to understand a conventional character font generator disclosed in Japanese patent laid-open publication No. 163891/1988. The font character generator retrieves several sampling points configuring a character from a sampling point file 22 by a sampling point read out unit 21, and produces lines, referred to as skeleton lines, constituting the character by a skeleton line calculator 23 using an approximation method. Thereafter, the character generator determines, by means of a modifying information calculator 24, patterns associated with modifying information which is specified in advance with regard to respective points constituting the skeleton lines, and supplies the patterns to an image memory 25.

Figure 2:
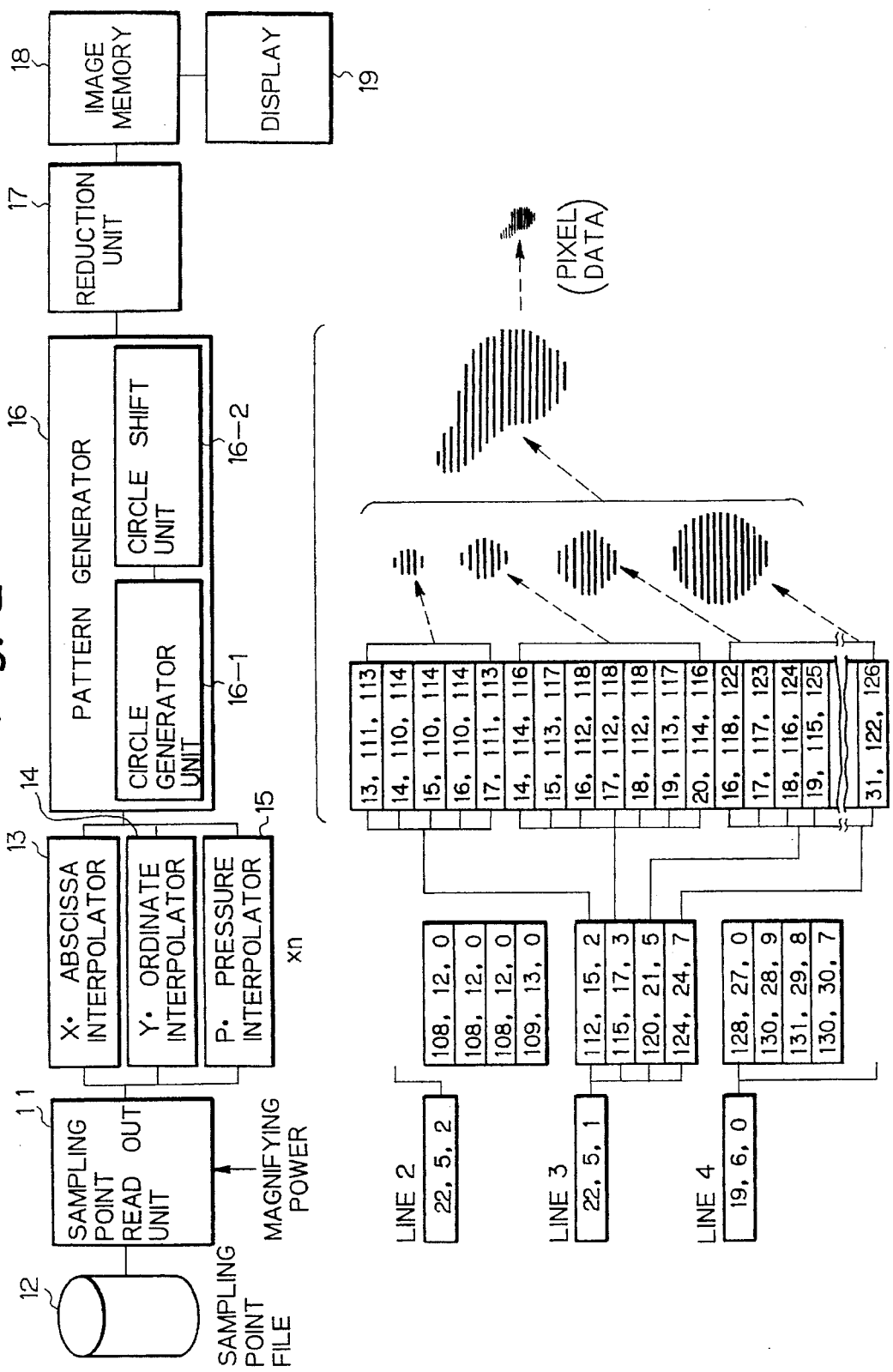
FIG. 2 is a block diagram showing an embodiment of a character generator showing sequential changes from sampling point data to reduced pixel data in accordance with the present invention.

The preferred embodiment of the present invention will now be described in detail with reference to the accompanying drawings. In FIG. 2, which is a block diagram showing an embodiment of a character generator in accordance with the present invention, an X abscissa, a Y ordinate and a pressure value at the coordinate position (X,Y) for generating a character are produced in the following manner: first, a sampling point read out unit 11 retrieves sampling point data of a sampling point one after another from a sampling point file 12; second, the sampling point read out unit 11 multiplies the sampling point data by a particular magnification coefficient corresponding to a desired size of the character. The pressure values indicate pressures of a brush used for writing a character at positions (X,Y) of the character.

The output of the sampling point read out unit 11 is supplied to an interpolator 13 for the X abscissa, an interpolator 14 for the Y ordinate, and an interpolator 15 for the pressure value. The interpolators 13, 14 and 15 produce resultant, interpolated data of points between the sampling points.

Subsequently, whenever the sampling point data are fed to the interpolators 13, 14 and 15, the interpolators produce information on respective points for forming hand writing of the character. The outputs from the interpolators 13 and 14, i.e. the X and Y coordinate, are multiplied by an integer n to facilitate following processes for forming a high quality character.

The outputs of the interpolators 13, 14 and 15 are supplied to pattern generator means 16 including a circle generator unit 16-1 and a circle shift unit 16-2. The circle generator 16-1 calculates and produces four independent circles composed of a plurality of parallel horizontal lines on the basis of the interpolated pressure values outputted from the pressure interpolator 15. The circles are outputted to the circle shift unit 16-2. The circle shift unit 16-2 shifts or converts the four independent circles into a pattern composed of a plurality of parallel horizontal lines and representing an enlarged stroke of the character on the basis of coordinate outputs of the X abscissa interpolator 13 and the Y ordinate interpolator 14. Thus the pattern generator 16 outputs an enlarged pattern represented by a plurality of parallel horizontal lines to a reduction unit 17. The reduction unit 17 reduces the enlarged pattern received from the pattern generator 16 as pixel data and feeds the pixel data to an image memory 18 in the form of pixel information. The pixel information is read out of the image memory 18, and is displayed on a display 19.

Figure 3:
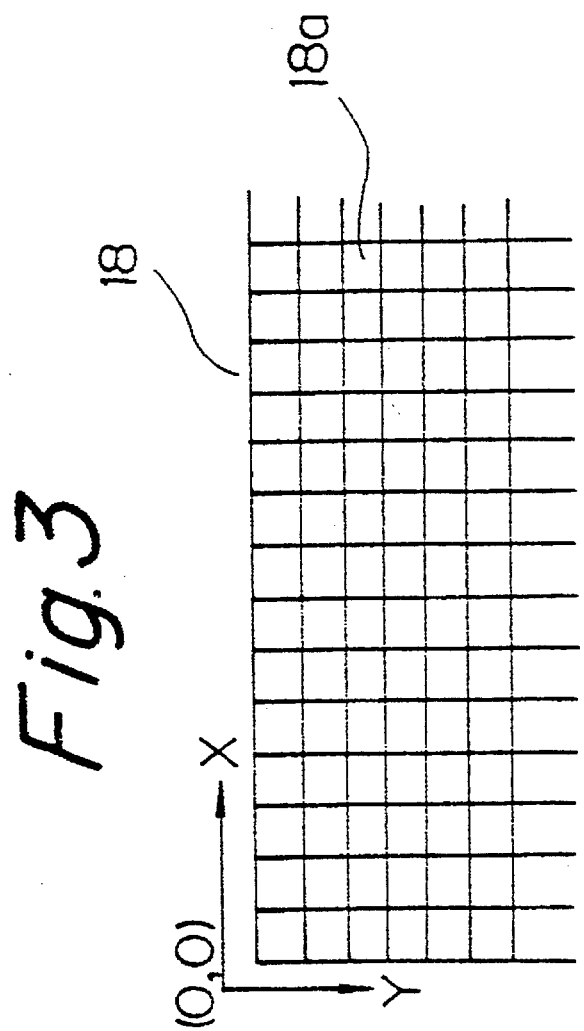
FIG. 3 is a schematic view showing an example of data storage areas included in an image memory of the embodiment shown in FIG. 2.

FIG. 3 is a schematic view illustrating an example of a storage region included in the image memory 18. As shown in this figure, the image memory 18 is a two-dimensional array of memory areas 18a each associated with different one of the pixels of an image. Each memory area 18a is designated to (X,Y) coordinate data of the horizontal line information representing pixel data of a character, and may record black-and-white pixel information.

The operation of the embodiment will now be described assuming that the patterns produced from the pattern generator 16 consist of a plurality of parallel horizontal lines shifted from the four independent enlarged circles, the radii of which are proportional to or associated with the interpolated pressure values, and the positions of which are defined by the interpolated coordinate values.

Figure 4:
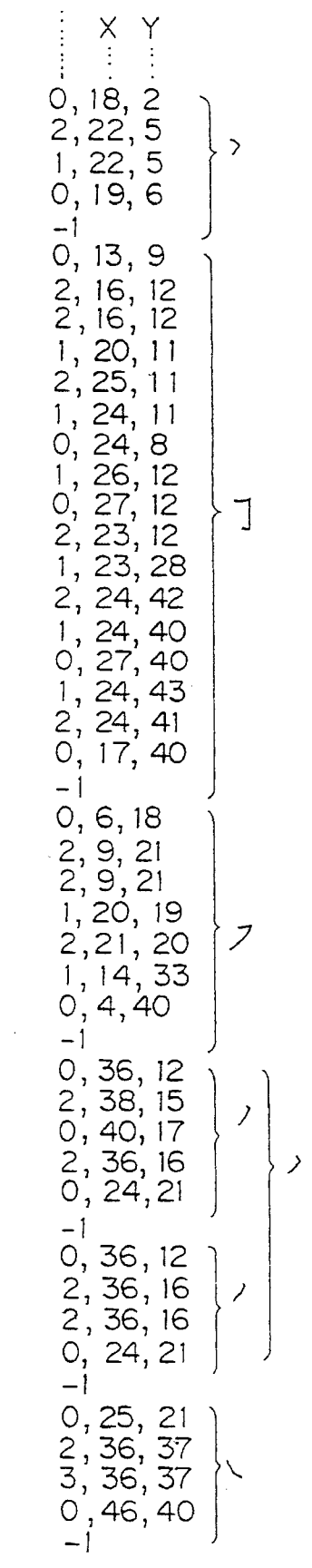
Figures 5, 6A, 6B, 6C, 7:
FIG. 5 is a view illustrating a character generated on the basis of the pixel data representing the sampling point data of FIG. 4.
FIGS. 6A, 6B and 6C are views illustrating characters of different size generated on the basis of the pixel data, FIG. 6A being an example reduced to 0.7, FIG. 6B being an example reduced to 0.5, and FIG. C being an example reduced to 0.3 of the character shown in FIG. 5.
FIG. 7 is a view illustrating an enlarged example of the character shown in FIG. 5.

FIG. 4 is a view illustrating an example of sampling point data of character components. FIG. 5 is a view illustrating a character generated on the basis of the sampling point data of FIG. 4, and FIGS. 6A, 6B and 6C, and 7 are views illustrating reduced and enlarged output examples of the character when the magnifying power inputted to the sampling point read out unit 11 is changed. More specifically, FIG. 6A is an example reduced to 0.7. FIG. 6B is an example reduced to 0.5. FIG. 6C is an example reduced to 0.3, and FIG. 7 is an enlarged example of the character shown in FIG. 5.

In FIG. 4, each line is associated with a sampling point data consisting of a pressure value as X abscissa, and a Y ordinate. Sampling points of a character are selected experimentally considering pressure changes in writing the character. Those sampling points make up a stroke that constitutes a kanji character, for example. To indicate the termination of each stroke, "−1" is inserted between the sampling point data.

As shown in FIG. 5 through FIG. 7, high quality of the generated character is maintained regardless of the reduction or enlargement of the character.

The amount of data needed to generate a character by the character generator in accordance with the present invention is much less than that needed by conventional character generators. This is because the character generator of the present invention uses pressure value information together with handwriting trace information, whereas the conventional character generators produce characters by using only handwriting trace information. Thus, the sampling point data of the present invention includes pressure values as well as X and Y coordinate.

Figure 8A:
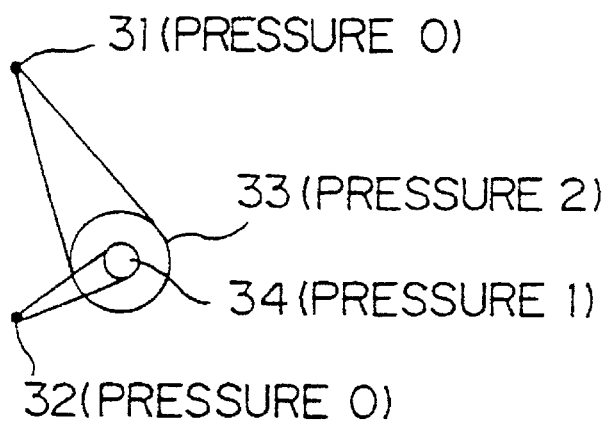
FIGS. 8A and 8B are views illustrating pressure values of the embodiment, FIG. 8A being an example of pressure values illustrating a first stroke of the character shown in FIG. 5, and FIG. 8B being an example of pressure values of a last stroke of the character shown in FIG. 5.
Figure 8B:
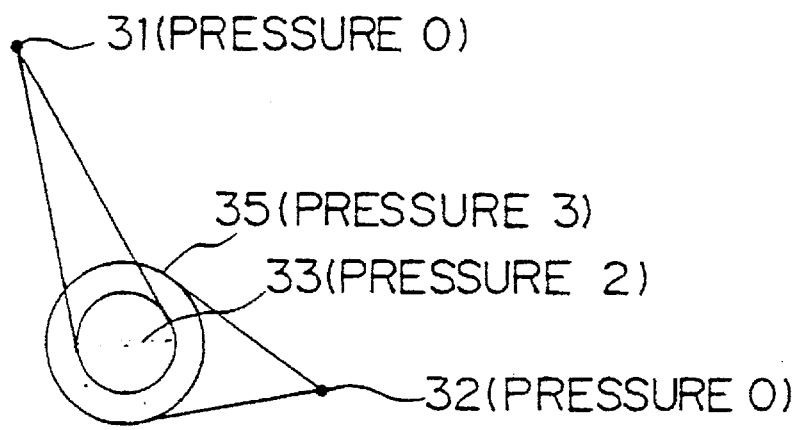

FIGS. 8A and 8B are views illustrating an example of pressure values of the embodiment at pressure value changing points. More specifically, FIG. 8A shows an example of pressure values at the pressure value changing points illustrating a first stroke of the character, FIG. 8B being an example of pressure values of a last stroke of the character. As shown in these figures, the pressure values are classified to four levels considering the pressure changing points: the pressure value at starting points 31 at which a brush, when used for writing a stroke of the character, is first placed, and the pressure value at releasing points 32 is substituted by "0"; the pressure value at holding points 33 is substituted by "2"; the pressure value at a brush tip writing point 34 is substituted by "1"; and the pressure value of a pressing point 35 is substituted by "3".

Figure 9:
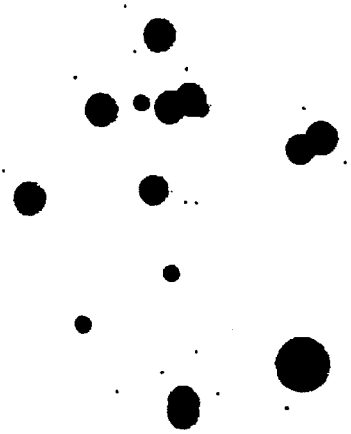
FIG. 9 is a view illustrating dots implemented by original data representative of pressure changing points of the character.

FIG. 9 is a view illustrating original data of pressure changing points of the character. As shown in this figure, the character is represented by such a small number of sampling points that the original character can be hardly identified. This is because the pressure values are included to the original data together with the X and Y coordinate.

Figure 10:
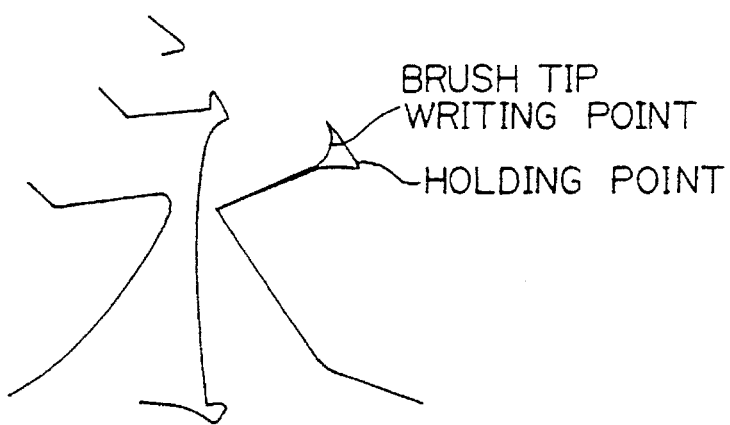
FIG. 10 is a five-time enlarged view illustrating an interpolated result of the handwriting of the character.
Figure 11:
FIG. 11 is a five-time enlarged view illustrating the final result of the character.

FIGS. 10 and 11 are five-time enlarged views illustrating an interpolated result of the handwriting of the character, and the final result of the character, respectively.

Next, the operation of the interpolators 13, 14 and 15 will be described by using the data of FIG. 4 and the following equations- When the interpolators 13, 14 and 15 use four-degree B-spline interpolation, the outputs x, y and p of the interpolators 13, 14 and are exressed as follows:

$$x = a_x + b_x t + c_x t^2 + d_x t^3, \quad (1)$$

$$y = a_y + b_y t + c_y t^2 + d_y t^3, \quad (2)$$

$$p = a_p + b_p t + c_p t^2 + d_p t^3, \quad (3)$$

where $0 \leq t \leq 1$, and $a_x, a_y, a_p, b_x, b_y, b_p, c_x, c_y, c_p, d_x, d_y,$ and $d_p$ are expressed by the following equations.

$$a_x = (x_0 + 4x_1 + x_2)/6,$$

$$a_y = (y_0 + 4y_1 + y_2)/6,$$

$$a_p = (p_0 + 4p_1 + p_2)/6;$$

$$b_x = (-3x_0 + 3x_2)/6,$$

$$b_y = (-3y_0 + 3y_2)/6,$$

$$b_p = (-3p_0 + 3p_2)/6;$$

$$c_x = (3x_0 - 6x_1 + 3x_2)/6,$$

$$c_y = (3y_0 - 6y_1 + 3y_2)/6,$$

$$c_p = (3p_0 - 6p_1 + 3p_2)/6;$$

$$d_x = (-x_0 + 3x_1 - 3x_2 + x_3)/6,$$

$$d_y = (-y_0 + 3y_1 - 3y_2 + y_3)/6,$$

$$d_p = (-p_0 + 3p_1 - 3p_2 + p_3)/6.$$

When the four sampling points $(x_0, y_0)$–$x_3, y_3$) are placed in this sequence, the (x, y) expresses an approximation curve that passes these four sampling points.

Figure 12:
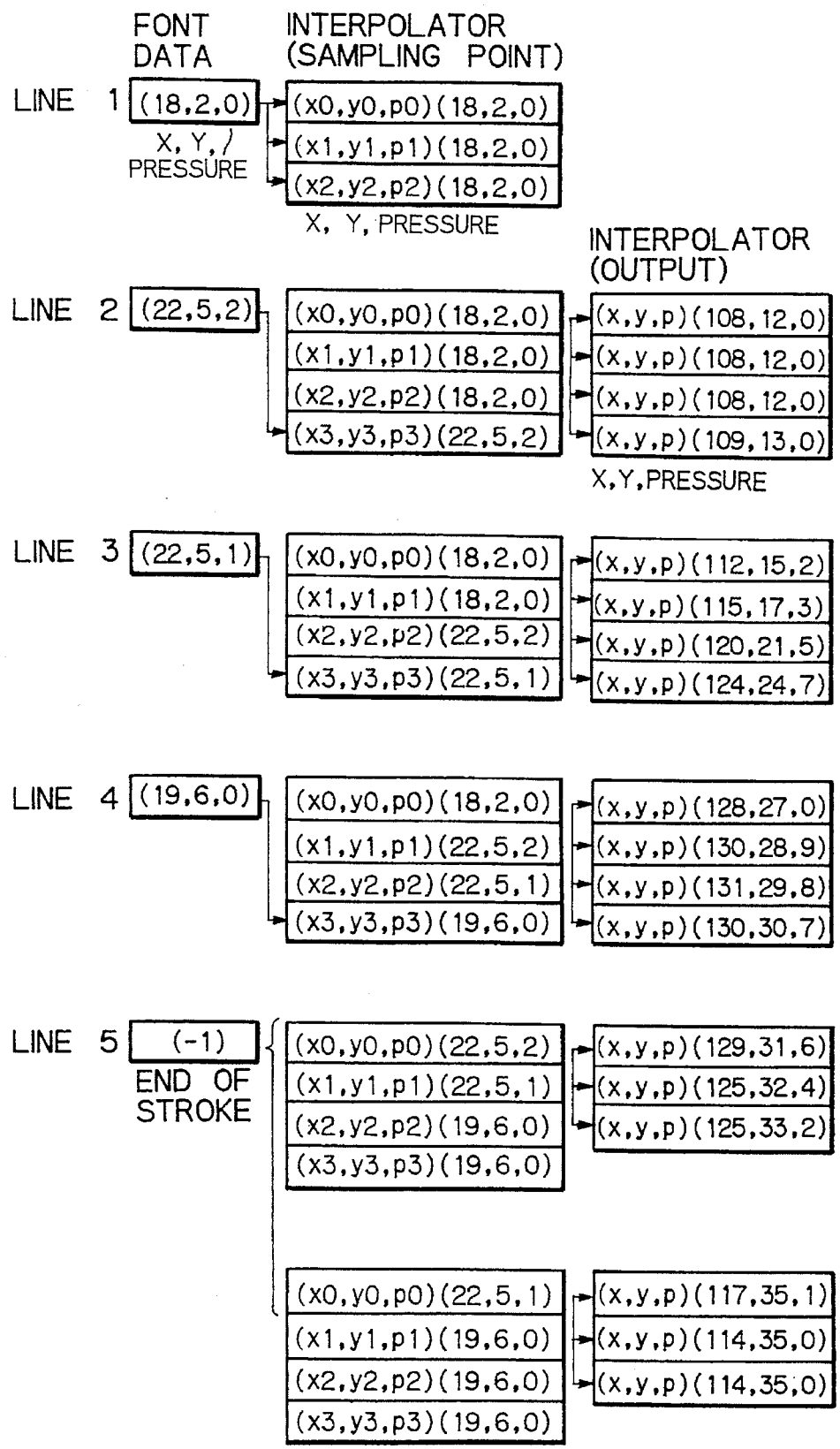
FIG. 12 is a view exemplifying how interpolation calculation proceeds on a character stroke.

FIG. 12 illustrates an example of the interpolation calculations. First, the sampling point data shown in FIG. 4 is retrieved line by line from the sampling point file 12 by the sampling point read-out unit 11 as shown in FIG. 2. The first to fourth lines correspond to the points 31, 33, 34 and 32 of FIG. 8. The first data, in which the pressure value, X abscissa, and Y ordinate are "0", "18", and "2", respectively, are supplied to the interpolators 13, 14 and 15. Here, the sampling point read-out unit 11 multiplies those values by the external magnifying power, and the resultant products are supplied to the interpolators 13, 14 and 15. In this case, the magnifying power is set at "1" for simplicity.

Each of the interpolators 13, 14 and 15 is provided with a memory including four areas: the interpolator 13 stores $x_0$–$x_3$; the interpolator 14 stores $y_0$–$y_3$; and the interpolator 15 stores $P_0$–$P_3$. The interpolators, receiving the above data, fill the upper three areas with the same data as shown at the top of FIG. 12. When the interpolators receive the second line of the sampling point data, i.e. (22, 5, 2), the interpolators produce four outputs: three of which are (108, 12, 0) and the other is (109, 13, 0).

The value "0" representing the pressure value p in the interpolated outputs is directed to a point at the respective coordinates.

The interpolation calculation in this case is performed as follows: First, the data applied to the interpolators 13, 14 and 15 are calculated in the form of what are resultant from multiplying the data represented by the equations (1)–(3) by the value "6" so as to eliminate the denominators of the coefficients of the equations (1)–(3). Then, the number of the outputs of the interpolators 13, 14 and 15 is specified according to the maximum distance of the adjacent pairs among $x_0$–$x_3$, $y_0$–$y_3$, and $p_0$–$p_3$. In this case, the distance between $x_2$ and $x_3$ is the maximum, and it is "4". Thus the number N of the outputs of the interpolators 13, 14 and 15 is determined to be "4". Next, the values of t in the equations (1)–(3) are determined according to the reciprocal of the number of outputs, that is, $1/N = 1/4$. Thus the values of t are determined as 0/4, 1/4, 2/4, and 3/4. These values are substituted in equations (1)–(3) to interpolate the values between the first and second lines of sampling point data. The coefficients of the equations (1)–(3) are specified by using the above equations for calculating the coefficients. Similar interpolation calculation is continued for each line of the sampling point data, and the resultant outputs shown in FIG. 12 are produced from the interpolators 13, 14 and 15.

Figure 13:
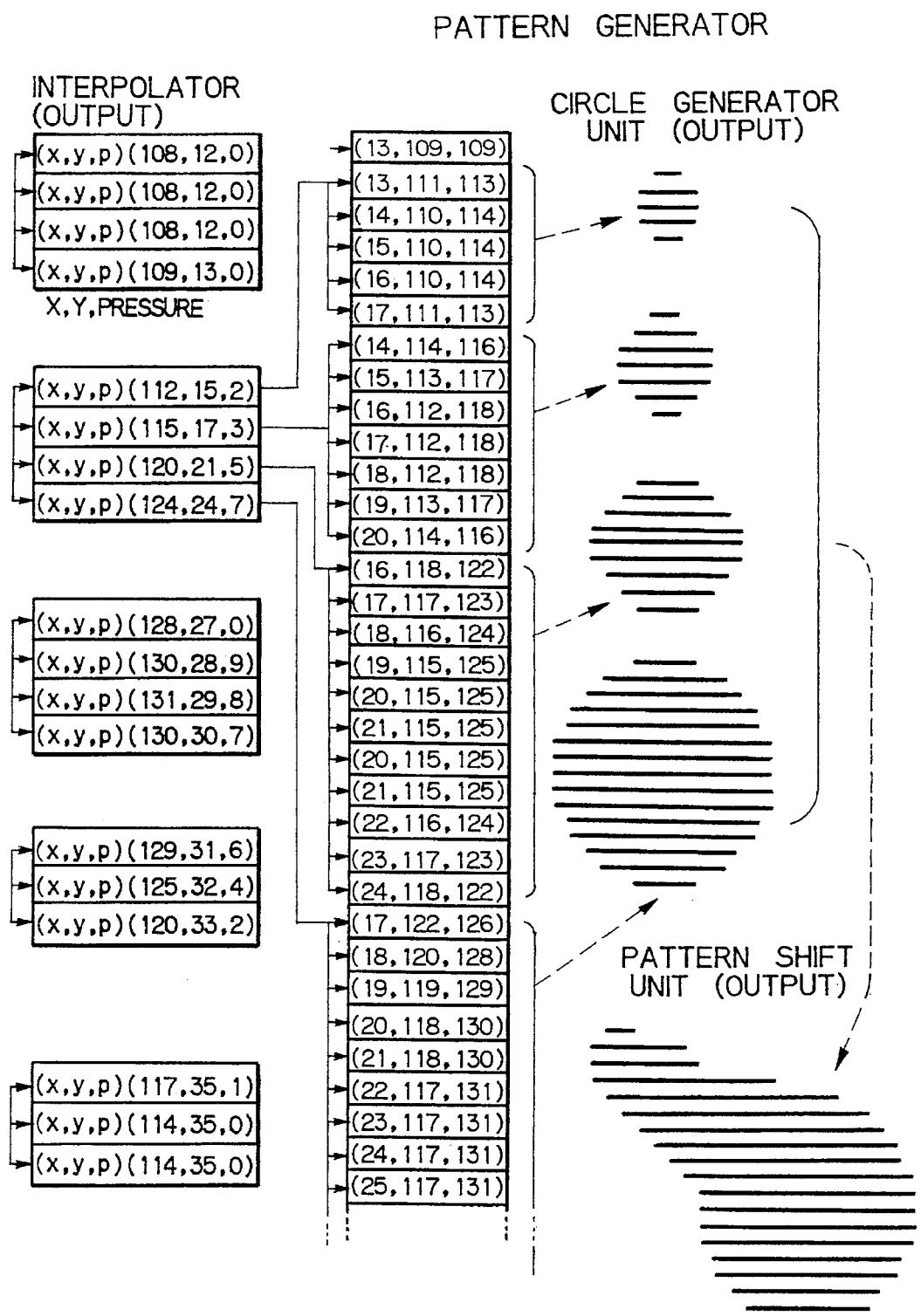
FIG. 13 is a view illustrating an example of the output data of a pattern generator of the embodiment.
Figure 19:
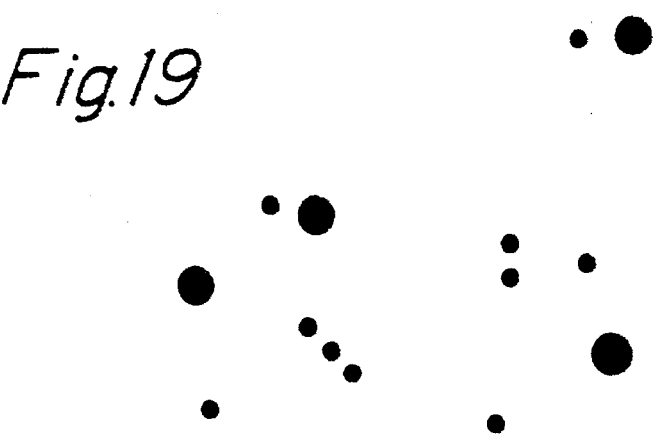
FIG. 19 is a view illustrating dots represented by original data of pressure changing points of the letters.
Figure 20:
FIG. 20 is a five-time enlarged view illustrating a pattern of limited width consisting of the horizontal lines.
Figure 21:
FIG. 21 is a five-time enlarged view illustrating a pixel data, final result of the letters.
Figure 22A:
FIGS. 22A–22F are views illustrating output examples when the letters are generated in cursive types, FIGS. 22A and 22B being examples in which each stroke is independently produced, FIGS. 22C and 22D being examples in which the terminal point of each stroke is once interrupted and then skipped to the next stroke, and FIGS. 22E and 22F being examples in which each stroke is joined to the next stroke.
Figure 22B:
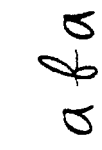
Figure 22C:
Figure 22D:
Figure 22E:
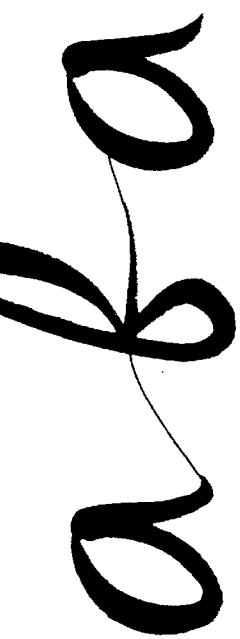
Figure 22F:

FIG. 13 shows an example of the output of the pattern generator 16. The pattern generator 16 comprises the circle generator unit 16-1 and the pattern shift unit 16-2 connected to the circle generator unit 16-1. The pattern generator 16 receives the interpolated sampling point data multiplied by the value "6".

The circle generator unit 16-1 calculates parallel horizontal line data for four groups each designated to a circle and generates four independent circles on the basis of the interpolated pressure values of the parallel horizontal line data calculated therein.

Each of the four groups of parallel horizontal line data contains parallel horizontal lines respectively passing ordinates $y_0$–$y_1$ and having minimum and maximum abscissas $x_0$–$x_1$ which determine the length of parallel horizontal lines. As shown in the first line of the first group of the parallel horizontal line data in FIG. 13, the parallel horizontal line data (13, 111, 113) is directed to represent a horizontal line having the length of value "111–113", i.e. value 2, at y ordinate 13.

The independent four circles thus represented by the four groups of parallel horizontal lines in enlarged size by the value "6" are outputted to the pattern shift unit 16-2.

The pattern shift unit 16-2 shifts the enlarged four circles received from the circle generator unit 16-1 to an enlarged pattern representing the first stroke of the character on the basis of the coordinate positions of the four groups of horizontal line data, wherein the centers of the parallel horizontal lines are respectively at $x_{112}$, $x_{115}$, $x_{120}$ and $x_{124}$, and wherein the first horizontal lines begin respectively at ordinates 13, 14, 16 and 17. The pattern generator 16 outputs the enlarged pattern thus shifted to the reduction unit 17.

The reduction unit 17 reduces the pattern received from the pattern generator 16 by the value "6" so as to produce pixel data representing the first stroke of the character.

The sampling points are successively read out to form the character as shown in FIG. 5. When the pressure values are negative, they are identified as terminations of strokes, and the sampling point read out unit 11 provides the interpolators 13, 14 and 15 with identical data twice in succession as shown in FIG. 12 to indicate a terminal and suspend the interpolation. If not suspended, cursive-type characters are generated.

Figures 14A, 14B, 14C, 14D, 14E, 14F:
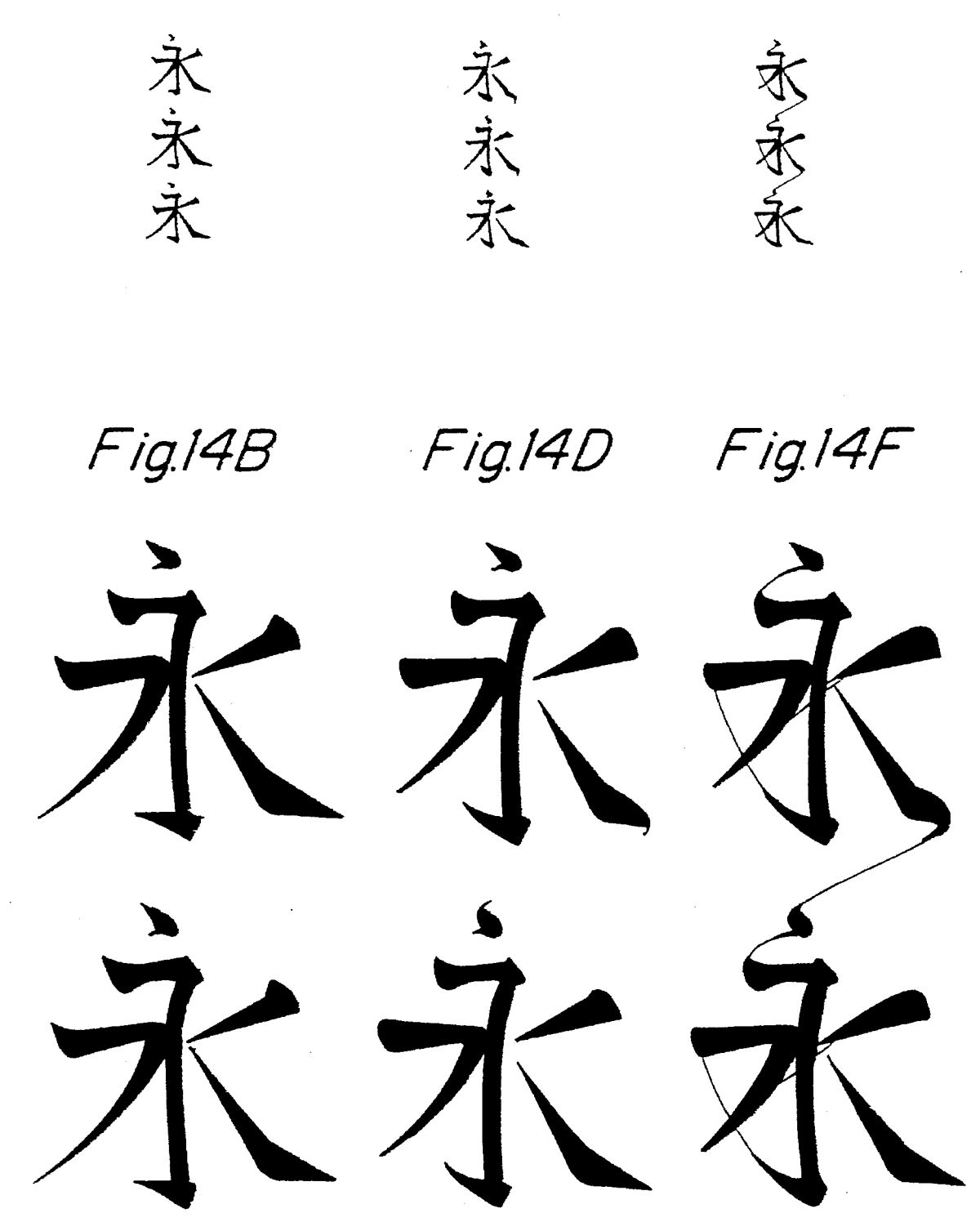

FIGS. 14A–14F illustrate output examples when the character is generated in cursive types. FIGS. 14A and 14B show examples in which each stroke is independently produced, FIGS. 14C and 14D show examples in which the terminal point of each stroke is once interrupted and then skipped to the next stroke, and FIGS. 14E and 14F show examples in which each stroke is continued to the next stroke. FIGS. 14B, 14D and 14F are five times enlarged views of the character.

These modified styles can be easily generated because it is achieved by only designating either to continue or to suspend the interpolation when the sampling point data is read out. The gray scale of characters can be easily obtained by reducing the density of the output data from the interpolators.

According to the embodiment, characters of desired sizes can be freely generated with a small amount of information per one character. For example, the character shown in FIG. 5 can be configured by 129 bytes of data in the present invention. If the character is defined by the bit-by-bit method, then it requires 288 bytes (=48×48 bits/8 bits) of data because the original data thereof consist of 48×48 bits.

Furthermore, since the maximum values of the pressure value, X abscissa, and Y ordinate of a character are 3, 47, and 47, respectively, the data of one line in FIG. 4 can be reduced to 2 bytes. Thus, when the end code "–1" in FIG. 4 is represented by one byte of data, the entire data in FIG. 4 can be defined by only 88 bytes, which is less than ⅓ of the amount necessary for the bit-by-bit method.

The above embodiment is described in terms of the character shown in FIG. 5 as an example. The embodiment may, however, also be extended to the alphabet.

FIGS. 15–22 show another example of a pair of letters "ab". FIGS. 15, 16, 17, 18, 19, 20, 21, and 22 correspond to FIGS. 4, 5, 6, 7, 9, 10, 11, and 14, respectively, and the letters "ab" are generated in a manner similar to that of the character shown in FIG. 5.

While the present invention has been described with reference to the particular illustrative embodiment, it is not to be restricted by this embodiment but only by the appended claims. It is to be appreciated that those skilled in the art can change or modify the embodiment without departing from the scope and spirit of the present invention.

What we claim is:

1. A method of electronically generating characters comprising the steps of:
   (a) preparing a sampling point file storing sampling point data of characters, each of the sampling point data being represented by X and Y coordinate values, and writing pressure values of strokes of the characters when written with a brush;
   (b) sequentially reading the sampling point data out of the sampling point file;
   (c) determining whether or not data between a first stroke of the character and a second stroke of the character or of another character successive to the first stroke are to be interpolated;
   (d) interpolating the X and Y coordinates and the pressure values of the sampling point data read out of the sampling point file, said step (d) not suspended for each pattern being directed to cursive type characters;
   (e) calculating maximum and minimum values of X coordinates on Y coordinates representative of parallel horizontal lines and generating a plurality of circles by using the parallel horizontal lines;
   (f) shifting the plurality of circles into a pattern as pixel data of the characters on the basis of X and Y coordinate positions; and
   (g) storing the pixel data in the image memory.

2. A method in accordance with claim 1, wherein said step (d) comprises the step of processing a B-spline interpolation on the coordinates values and the pressure values on the basis of the sampling point data.

3. A character generator comprising:
   a sampling point file for storing therein sampling point data including data of coordinates values and pressure values of a character;
   sampling point read-out means for reading out the sampling point data from said sampling point file;
   interpolating means for receiving the sampling point data from said sampling point read-out means and for processing a B-spline interpolation on the basis of the sampling point data received in a form in which the sampling point data are multiplied with a multiplier value determined from a degree of the B-spline interpolation without performing a division by the multiplier value to produce coordinates values and pressure values;
   pattern generating means connected to said interpolating means for generating pattern data consisting of parallel, horizontal lines and corresponding to part of the character on the basis of an output from said interpolating means; and reduction means connected to said pattern generating means for receiving the pattern data from said pattern generating means and dividing the pattern data received by a divisor value corresponding to the multiplier value.

4. A character generator in accordance with claim 3, wherein the sampling point data include data of an end portion of the character, which includes a point at which the pressure value is substantially null.

5. A character generator in accordance with claim 3, wherein the sampling point data include data of a point of the character at which the pressure value changes.

6. A character generator in accordance with claim 3, wherein said pattern generating means comprise:

a circle generator unit for generating data of circles on the basis of the output from said interpolating means; and a pattern shift unit connected to said circle generator unit for shifting the circles onto a pattern corresponding to part of the character on the basis of the output from said interpolating means to produce an output resultant from the shifting as the pattern data.

7. A character generator in accordance with claim 3, wherein said interpolating means multiply the sampling point data by such an enlarged value that the coefficient of the B-spline will be a natural number and said reduction means reduce the pattern data consisting of parallel horizontal lines as pixel data by dividing the pattern data by the natural number.

8. A character generator in accordance with claim 3, wherein the grade of B-spline interpolation is "4" and the coefficients of the multiplication and the division are "6".

* * * * *